United States Patent
Boesel et al.

(10) Patent No.: US 6,286,994 B1
(45) Date of Patent: Sep. 11, 2001

(54) SYSTEM, METHOD AND COMPUTER PROGRAM PRODUCT FOR CONTROLLING A TRANSMIT SIGNAL USING AN EXPECTED POWER LEVEL

(75) Inventors: Robert W. Boesel, San Diego; Levent Aydin, Del Mar, both of CA (US); Lindsay A. Weaver, Jr., Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/069,885

(22) Filed: Apr. 29, 1998

(51) Int. Cl.⁷ .................................................. H04L 27/04
(52) U.S. Cl. ..................... 374/146; 375/295; 375/297; 455/115; 455/126
(58) Field of Search ..................................... 375/295, 296, 375/297, 146; 455/126, 103, 115

(56) References Cited

U.S. PATENT DOCUMENTS

| | | | |
|---|---|---|---|
| 5,303,268 | * | 4/1994 | Tsutsumi et al. ....................... 375/60 |
| 5,715,526 | * | 2/1998 | Weaver, Jr. et al. .................. 455/126 |
| 5,809,420 | * | 9/1998 | Ichiyanagi et al. ................... 455/103 |
| 5,842,114 | * | 11/1998 | Ozluturk ................................ 455/69 |
| 5,930,242 | * | 7/1999 | Mimura ................................ 370/331 |
| 6,009,119 | * | 12/1999 | Jovanovich et al. ................. 375/219 |

* cited by examiner

*Primary Examiner*—Stephen Chin
*Assistant Examiner*—Dac V. Ha
(74) *Attorney, Agent, or Firm*—Philip R. Wadsworth; Christopher O. Edwards; Raymond B. Hom

(57) ABSTRACT

A system, method and computer program product that uses an expected output power level to compensate for slowly changing unintentional power fluctuations in a signal transmission system such that the actual transmitted power matches a calculated desired transmit power. Digital expected power data is sampled and filtered to generate an expected output power level. Actual output data is sampled and filtered to generate an actual output power level. A comparator periodically compares the expected output power level to the actual output power level. Preferably, the comparator first removes a correction value from the actual output power level that was added to the transmit signal to correct for unintentional power fluctuations. The resultant ratio or difference is sent to a correction module which generates a correction value therefrom. The correction value is converted to a dB quantity and added to existing correction values.

15 Claims, 15 Drawing Sheets

TRANSMISSION SYSTEM

FIG. 1 TRANSMISSION SYSTEM

FIG. 2 GAIN VS. AMBIENT TEMPERATURE

FIG. 5  TYPICAL TRAFFIC CHANNEL FRAME

FIG. 9    POWER FLOW THROUGH TRANSMIT CHAIN

FIG. 10   OPEN LOOP MODEL

FIG. 11 CLOSED LOOP MODEL

FIG. 12 BLOCK DIAGRAM OF RFIC TRANSMIT POWER CONTROL LOOP

FIG. 13  TPTL LOOP WITH THE FIRST ORDER IIR FILTER

FIG. 14 SIMPLIFIED DIAGRAM FOR RESIDUAL ERROR

US 6,286,994 B1

SYSTEM, METHOD AND COMPUTER PROGRAM PRODUCT FOR CONTROLLING A TRANSMIT SIGNAL USING AN EXPECTED POWER LEVEL

BACKGROUND OF THE INVENTION

I. Field of the Invention

The present invention is directed to control of transmit signal power using digital representations of expected output power.

II. Description of the Related Art

In signal transmission systems it is important to maintain expected power levels in transmit signals. For example, in code division multiple access (CDMA) cellular systems, performance is dependent on accurate control of radiated power from both subscriber units and base stations. The precise level of radiated power for the forward link serves to balance the forward and reverse link boundaries of a sector or cell. This, in turn helps to reduce the size of hand-off regions, increase overall system capacity and improve subscriber performance in the hand-off region. In addition, industry standards require that the total transmitted power remain within +2 dB and −4 dB of the nominal power rating.

In order to maintain the forward transmit power at a desired level it is necessary to implement a mechanism that compensates for unintentional gain fluctuations observed in various components of the transmit chain. Unintentional variations can be caused by drifting operating points resulting from aging, changes in the ambient temperature, air pressure and humidity levels. Other contributing factors such as saturation of amplifiers and changes in the traffic load (i.e., desired power level) can be included. Calibration procedures do not generally ensure precise levels of output power over time. A signal-based control system that compares an expected output level to the actual output level is desired.

In addition to unintentional power fluctuations, many types of signal transmission systems intentionally vary or fluctuate output power. For example, in CDMA systems, output power levels are intentionally varied based upon such factors as, for example, the number of active mobile units, the amount of traffic to each mobile unit, and the location of mobile units. Moreover, each channel in a CDMA system can have an independent expected power level. In many of the channels, such as in forward traffic channels, expected output power levels can vary from frame to frame. Thus, one of the difficulties that is encountered in such systems is distinguishing between intentional fluctuations and unintentional fluctuations.

What is needed is a system, method and computer program product for compensating for unintentional power fluctuations.

SUMMARY OF THE INVENTION

The present invention is a novel and improved system, method and computer program product that controls the overall gain of a transmit chain such that the actual transmitted power matches a calculated desired transmit power. The present invention is referred to herein as a transmit power tracking loop (TPTL).

The TPTL receives digital power data from a digital signal processing portion of a transmitter and actual output data from a transmitting portion of the transmitter. The digital power data is sampled and filtered to generate an expected average output power level. The actual output data is sampled and filtered to generate an actual average output power level. A comparator periodically compares the expected output power level to the actual output power level. Preferably, the comparator first removes a correction value from the actual output power level that was added to the transmit signal to correct for unintentional power fluctuations. The resultant ratio is sent to a correction module which generates a correction value therefrom. The correction value is converted to a suitable quantity and used to adjust correction values.

In one embodiment, the TPTL is implemented in a code division multiple access (CDMA) cellular telephone system that includes a digital signal processor which includes multiple digital channels. Digital power data from the digital channels is sampled, filtered and added together to generate the expected output power level. The digital power data can include, for example, a forward traffic gain value ($G_t$), a power control gain value ($G_s$) and a traffic data rate value ($r_t$) that are associated with the respective channel.

In one embodiment of a CDMA application, the digital power data is sampled and filtered every frame, the actual power data is sampled and filtered every other frame and the comparator compares the expected output power level with the actual power level once every fifty frames. In this embodiment, the filter that filters the actual power has a time constant that is twice the time constant of the filter that filters the expected power data such that the averaging time windows are identical.

The present invention distinguishes between unintentional power fluctuations that vary slowly over time and intentional power fluctuations that vary dynamically. The present invention accurately corrects for slowly changing unintentional power fluctuations that can be due to, for example, temperature changes and component aging. The present invention is a signal-based system and thus is not dependent on calibration conditions for accuracy.

Further features and advantages of the present invention, as well as the structure and operation of various embodiments of the present invention, are described in detail below with reference to the accompanying drawings.

BRIEF DESCRIPTION OF THE DRAWINGS

The features, objects, and advantages of the present invention will become more apparent from the detailed description set forth below when taken in conjunction with the drawings in which like reference characters identify correspondingly throughout. Additionally, the left-most digit(s) of a reference number identifies the drawing in which the reference number first appears.

DETAILED DESCRIPTION OF THE PREFERRED EMBODIMENTS

I. Overview and Discussion of the Invention

The present invention is a system, method and computer program product that compensates for unintentional power fluctuations in signal transmission systems. The present invention can distinguish between intentional power fluctuations and unintentional power fluctuations and can compensate for unintentional power fluctuations without affecting intentional fluctuations.

The present invention periodically compares a filtered, or running average, of a digital representation of expected output power to a corresponding filtered, or running average, of an actual measured output power from an antenna. In a multi-channel digital system, a digital representation of the expected output power for each channel is filtered and added for comparison to the filtered, averaged actual output power.

If correction factors were added to the transmit signal between the digital signal processor and the antenna, such as in an up-converter of a transmitter, the correction factors are subtracted from the actual output signal prior to filtering and comparison. The result of the periodic comparison is filtered, or averaged over time. The filtered result is converted into a correction gain or attenuation and applied to the transmit signal.

By filtering, or averaging, the signals over time, high frequency intentional variations in output power are filtered out. As a result, only slowly changing, unintentional fluctuations are compensated for.

II. Example Environment

The present invention can be implemented in a variety of signal transmission systems in which one or more digital signals are converted to one or more analog signals for transmission. The present invention is referred to herein as a transmit power tracking loop (TPTL), which can be implemented in software, firmware, hardware, or any combination thereof.

Figure 15:
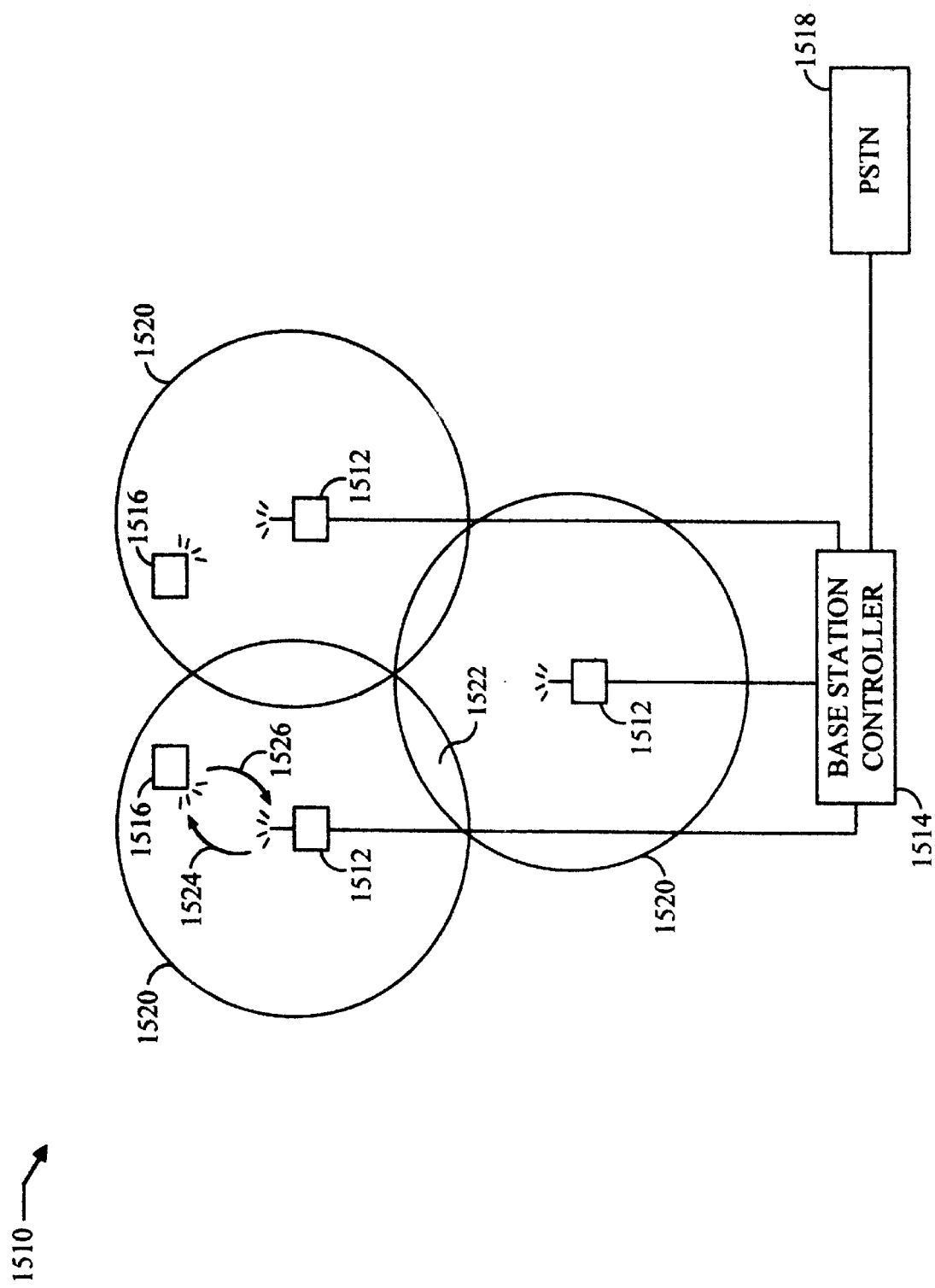
FIG. 15 is an illustration of a cellular telephone network.

In an exemplary embodiment, the TPTL is implemented in a code division multiple access (CDMA) cellular telephone system. Referring to FIG. 15, an exemplary CDMA cellular telephone system 1510 can include a plurality of base stations 1512, one or more base station controllers 1514 and a plurality of subscriber units 1516. Base stations 1512 are controlled and coordinated by base station controller 1514.

Base stations 1512 and base station controllers 1514 provide communications between separate subscriber units 1516 and between subscriber units 1516 and public service telephone networks (PSTN) 1518. Each base station 1512 transmits to subscriber units 1516 over a forward link 1524. Each base station 1512 receives transmissions from subscriber units 1516 over a reverse link 1526.

Each base station 1512 operates within a cell 1520. Cells 1520 can be defined by the transmission ranges of base stations 1512 and by the transmission ranges of subscriber units 1516. Transmission ranges can vary depending upon transmission wavelength, terrain, weather conditions, et cetera.

Typically, base stations 1512 and base station controllers 1514 employ a hand-off scheme that permits subscriber units 1516 to move from cell to cell without interruption of communications. Hand-offs occur within hand-off regions 1522. Such a cellular telephone system can be referred to as a mobile cellular telephone system. Hand-offs are discussed in, for example, U.S. Pat. No. 5,475,870, "Apparatus and Method for Removing a Base Station from a Cellular Communications System", incorporated herein by reference in its entirety.

Figure 1:
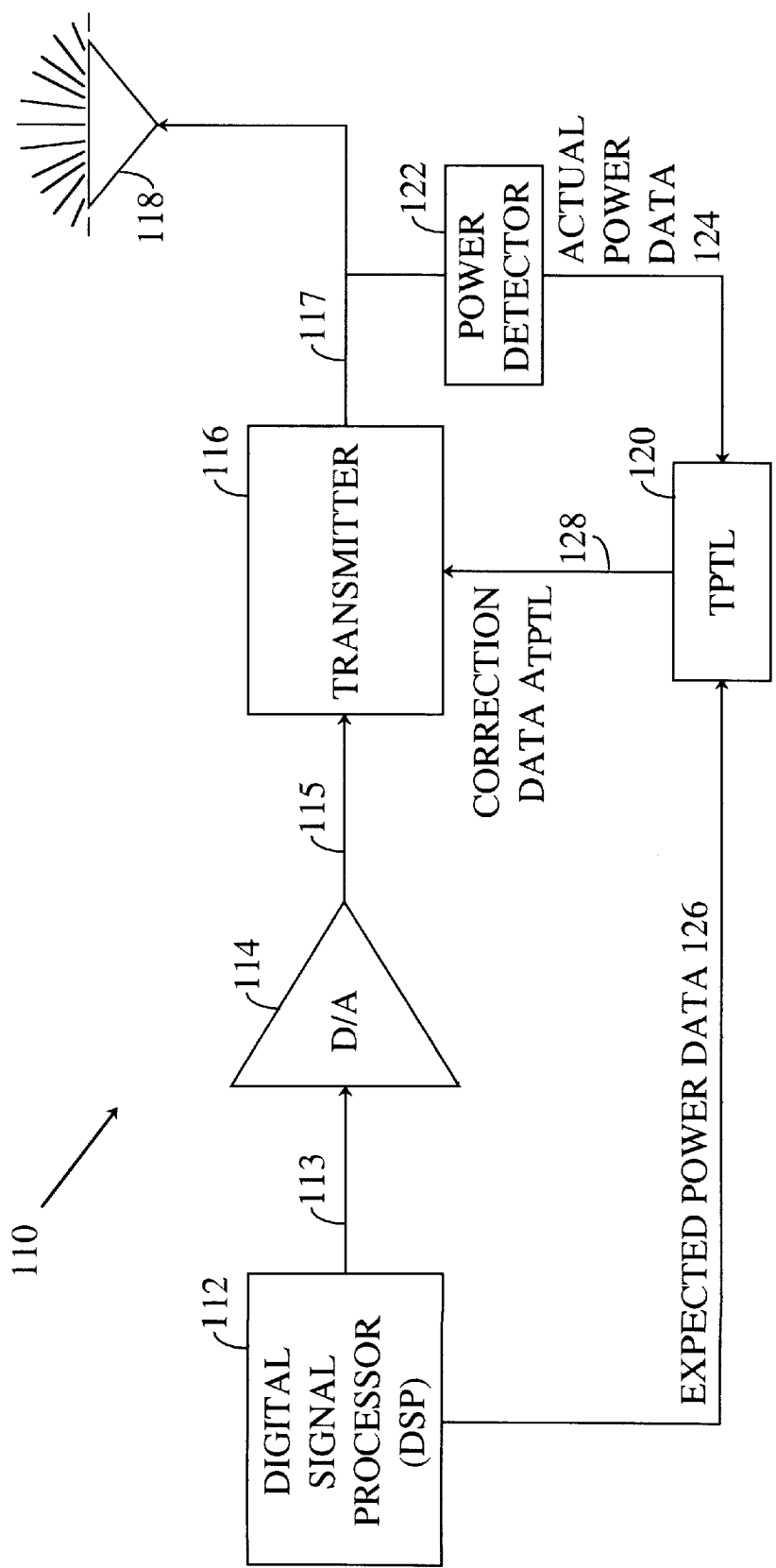
FIG. 1 is a block diagram of a transmission system that employs a transmit power tracking loop (TPTL) that compensates for unintentional power fluctuations, in accordance with the present invention.

Referring to FIG. 1, the present invention is illustrated in a transmission a system 110, which can be part of base station 1512, a part of base station controller 1514 or a combination thereof. Transmission system 110 includes one or more digital signal processors (DSP) 112 that output one or more digital signals 113. Digital signals 113 are converted to analog signals 115 by digital-to-analog (D/A) converter 114. Analog signals 115 are received by transmitter 116 which processes them for broadcast by antenna 118.

Figure 2:
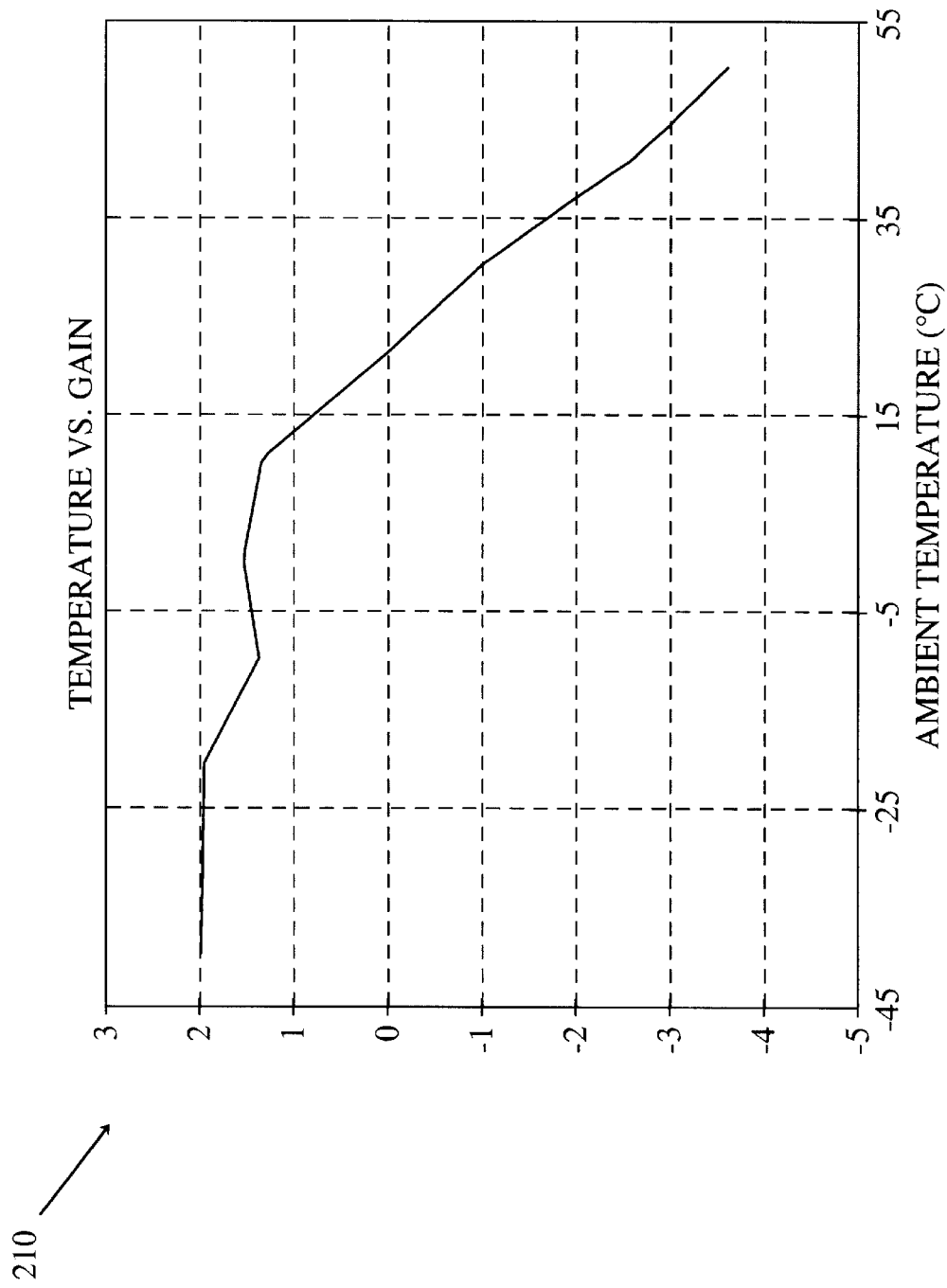
FIG. 2 is a graphical illustration of gain variation (relative to nominal) versus temperature in a typical transmission system.

Components within transmitter 116, such as, for example, radio frequency (RF) components, suffer from drift or unexpected power fluctuations that can be caused by, for example, temperature changes and component aging. For example, referring to FIG. 2, a plot 210 of temperature versus gain variation is provided for a mini-base station transmit system (BTS) in a CDMA system. Plot 210 illustrates that as ambient temperature increases, system gain decreases. Gain variation is normalized to a nominal gain at 20° C. ambient temperature and 39 dBm total output power.

A conventional approach to compensating for unintentional fluctuations is to design components within transmitter 116 to be less susceptible to temperature changes and aging. In addition, transmitter 116, or portions thereof, can be maintained in an artificial environment such as air conditioning. In practice, however, transmitter components, such as RF components, still suffer from temperature and aging-induced drift.

III. Transmit Power Tracking Loop (TPTL)

The present invention provides a transmit power tracking loop (TPTL) 120 that receives and compares expected power data 126 from DSP 112 and actual power data 124 from power detector 122. TPTL 120 distinguishes between intentional fluctuations and unintentional fluctuations and generates correction data 128 therefrom to correct for unintentional fluctuations without affecting intentional fluctuations.

Figure 3:
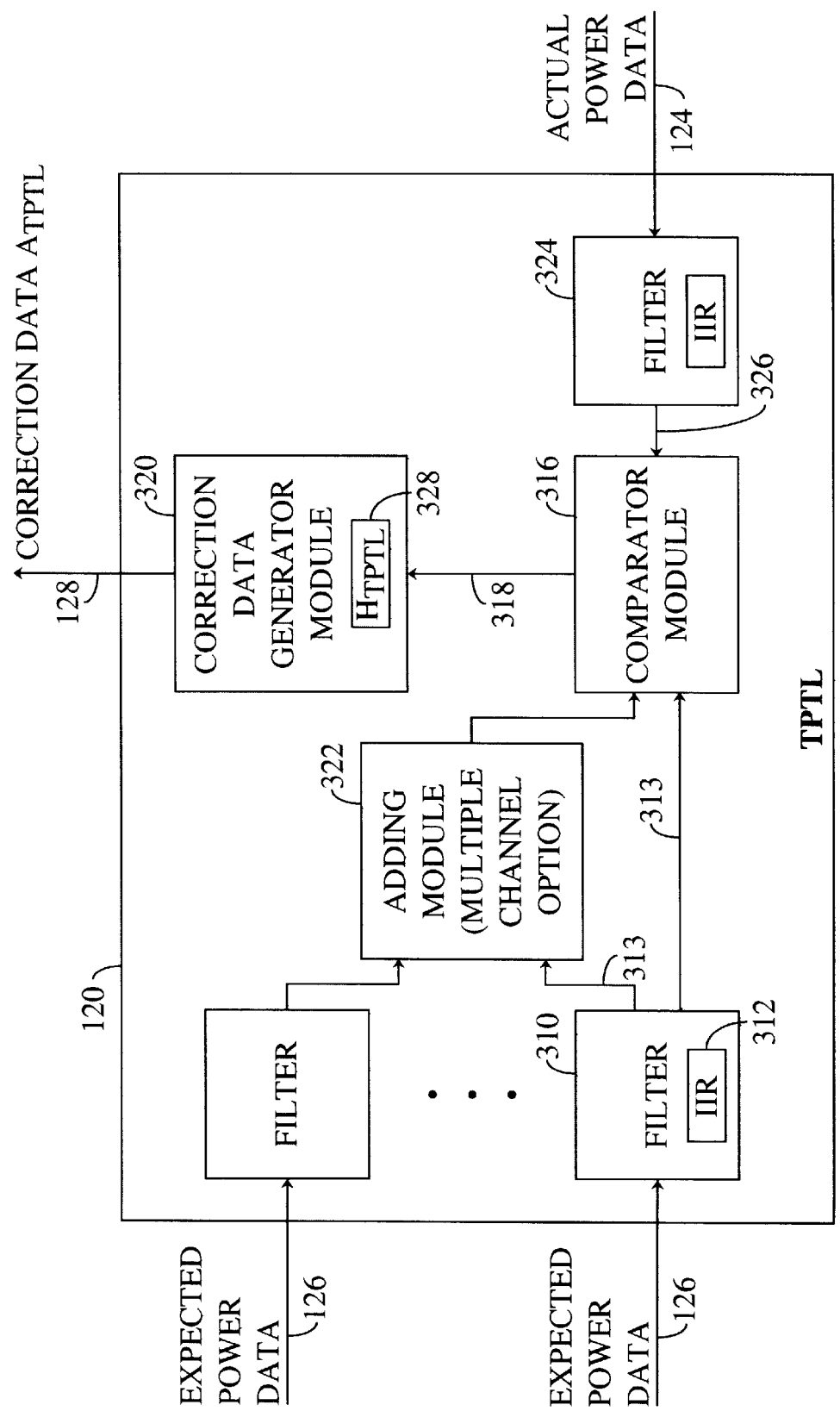
FIG. 3 is a block diagram of a TPTL that receives digital representations of expected output power and actual output power data for comparison and for generation of correction data, in accordance with the present invention.

Referring to FIG. 3, TPTL 120 includes one or more first filters 310 that filter or average samples of digital expected output power data 126. Filters 310 can include, for example, a single-pole, infinite-impulse response (IIR) filter 312 for filtering expected power data 126. IIR 312 can average expected power data 126 according to equation 1, where Pk is the present expected output power level and $\overline{Pk-1}$ is the prior average expected output power level.

$$Pk = \gamma \cdot \overline{Pk-1} + (1-\gamma) \cdot Pk \quad (1)$$

The constant γ determines the weighting that is applied to the present expected power level Pk versus the prior average expected output power level. For example, as γ approaches unity or one, the present average expected power $\overline{Pk}$ approaches the value of the prior expected average power level $\overline{Pk-1}$. Alternatively, as γ approaches zero, the present average expected power level $\overline{Pk}$ approaches the value of the present expected power level Pk. Many other suitable averaging mechanisms are known to those skilled in the art and the exact filtering method employed by filter 310 does not affect the present invention.

TPTL 120 includes a second filter 324 that filters or averages samples of actual power data 124. Filter 324 can be similar to filters 310. Prior to filtering actual power data 124, TPTL converts actual power data 124 from a voltage to dBm, subtracts off any correction that was added to compensate for breathing and wilting/blossoming and converts the result to linear units (mWatts).

TPTL 120 includes a comparator module 316 that periodically compares filtered expected power data 313 with filtered actual power data 326. Prior to a comparison, comparator module 316 removes the current TPTL correction data 128 from filtered actual power data 326 and compares the result with filtered expected power data 313.

The ratio 318 of the expected power to the measured power is sent to correction data generator module 320 which filters the ratio in, for example, a single pole IIR filter 328, having a transfer function $H_{TPTL}$. The calculated TPTL gain correction is then converted to a dB quantity and is added to the sum of the existing attenuation or gain value and is output as correction data 128.

In an embodiment, where DSP 112 is a multi-channel DSP, TPTL 120 includes an optional adding module 322 that adds filtered outputs 313 from filter 310 for each digital channel. The output of adding module 322 is sent to comparator module 316 for comparison to filtered actual power data 124. Alternatively, in a multi-channel system, expected power data 126 can be received by adding module 322 for addition of expected power data from each channel and the result forwarded to filter 310 (not shown).

In another embodiment, the functions of filter 310 and adding module 322, when employed, can be performed in DSP 112. This embodiment can be implemented, for example, where DSP 112 includes part or all of the hardware, firmware and/or software necessary for performing the functions of filter 310 and adding module 322.

Expected power data 126 and actual power data 124 are sampled and filtered at a higher rate than comparator module 316 compares expected output power and actual output power levels. Thus, TPTL 120 is able to distinguish between slowly changing unintentional fluctuations and fast changing intentional fluctuations. This is especially important in dynamically variable transmission systems, such as CDMA cellular telephone systems, where transmission power levels vary intentionally from frame to frame. Thus, while expected power levels and actual power levels can be measured as often as every frame, filters 310 and 324 and comparator module 316 ensure that correction data 128 corrects only for slowly changing differences between expected output data 126 and actual output data 124.

TPTL 120 can be implemented in a variety of signal transmission systems in which one or more digital signals are converted to one or more analog signals for transmission.

The present invention is now described as implemented in a code division multiple access (CDMA) cellular telephone system, such as a CDMA system developed by QUALCOMM, Incorporated of San Diego, Calif. The examples provided herein are intended to assist in the description of the present invention, not to limit it.

CDMA is a technique for spread-spectrum multiple-access digital communications that create channels through unique code sequences. CDMA systems employ forward CDMA channels to transmit signals from base stations to mobile units and reverse CDMA channels to transmit signals from mobile stations to base stations. Forward CDMA channels typically include 64 code channels as specified in "TIA/EIA/IS-95A Interview Standard, Mobile Station-Base Station Compatibility Standard for Dual-Mode Wideband Spread Spectrum Cellular System," published by Telecommunications Industry Association (TIA), May 1995, and incorporated herein by reference. Alternatively, forward CDMA channels can include 128 code channels or any other number of code channels. CDMA is discussed in, for example, U.S. Pat. No. 5,103,459, entitled, "System and Method for Generating Signal Waveforms in a CDMA Cellular Telephone System," incorporated herein by reference in its entirety.

The code channels are typically defined by modulation of the data to be transmitted onto one of a set of 64 Walsh codes (code channels 0–63). Generally, code channel 0 is a pilot channel, code channels 1–7 can be paging channels or traffic channels, code channels 8–31 can be assigned to traffic channels, code channel 32 can be a synchronization channel (sync channel) and the remaining code channels can be traffic channels.

Figure 4:
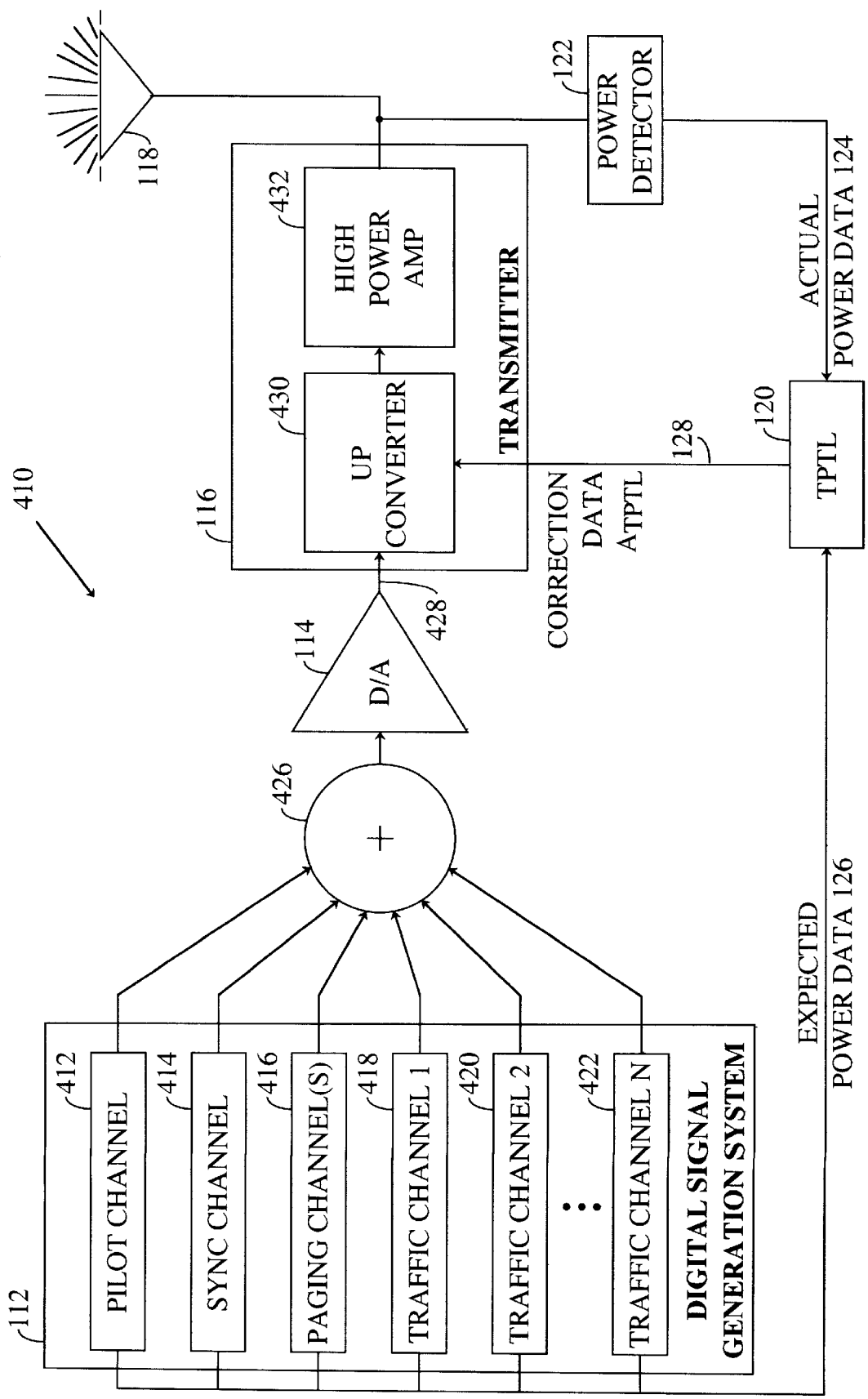
FIG. 4 is a block diagram of a multiple channel code division multiple access (CDMA) system that employs TPTL, in accordance with the present invention.

Referring to FIG. 4, a CDMA system 410 is illustrated in which DSP 112 is a multi-channel CDMA DSP. DSP 112 includes a pilot channel 412, a sync channel 414, paging channels 416 and traffic channels 418–422.

Pilot channel 412 is an un-modulated, direct-sequence spread spectrum signal that is transmitted continuously by a base station on a forward CDMA channel. The pilot channel allows a user terminal to acquire the timing of the forward CDMA channel, provides a phase reference for coherent demodulation and symbol combining, and provides a means for signal strength comparison between beams, satellites or base stations for determining when to hand-off.

Sync channel 414 is used to transport information that is needed for initial time synchronization. Such information can include the system time, the state of a long code generator and the number of leap seconds since the start of system time. Once a user terminal receives the information in the sync channel, it will be able to synchronize its timing to that of the paging channel and the forward traffic channel.

Paging channel(s) 416 are used for transmission of system overhead information and user-specific and terminal-specific messages from a base station to a user terminal when not in a call. There can be 0 to 7 paging channels transmitted by a base station on a forward CDMA channel.

Forward traffic channel(s) 418–422 are used to transmit user and signaling traffic from a base station to a user terminal during a call. Forward traffic channels 418–422 can be transmitted on any code channel that is not used for the pilot channel, sync channel, or paging channel. Thus, the maximum number of forward traffic channels that can be simultaneously supported by a forward CDMA channel is equal to the total number of code channels minus the number of pilot, sync and paging channels operating on the same forward CDMA channel.

The outputs of channels 412–422 are added by an adder 426, the result of which is converted from digital to analog by a D/A converter 424. Alternatively, the outputs of channels 412–422 can be D/A converted and then added by adder 426. Analog signals 428 are then up-converted to RF signals in up-converter 430. The RF output of up-converter 430 is amplified by a high-power amplifier 432 for broadcasting by antenna 118.

The high-power output signal from high-power amp 432 is received by power detector 122 which outputs actual power data 124 to TPTL 120. TPTL 120 also receives expected power data 126 from each of channels 412–422. Pilot channel 412, sync channel 414 and paging channels 416 are transmitted at a constant or level transmit power. Power levels in traffic channels 418–422, however, vary dynamically depending upon, for example, the number of mobile users, the amount of traffic flowing between base stations and mobile users, and locations of mobile users. Digital power data 126 from channels 412–422 are filtered in filter 310 and added in adding module 322 (FIG. 3).

Referring again to FIG. 3, the filtered expected output power contributed by channels 412–422 are then compared to filtered actual power data 124 in comparator module 316. The output of comparator module 316, ratio or difference data 318, is sent to correction data generator module 320 where correction data 128 is generated. Correction data 128 is sent to up-converter 430 for attenuating or increasing the power level of analog signals 428.

Expected power data 126 can be in a variety of forms. Thus, the expected output power for a channel can be determined in a variety of ways. In one embodiment, expected output power is calculated from a frame rate, a traffic data rate $r_t$, a forward traffic gain $G_t$ and a power control gain $G_s$, according to equation 2 or equation 3 below. In order to more fully understand the calculations, the following description can be helpful.

Figure 5:
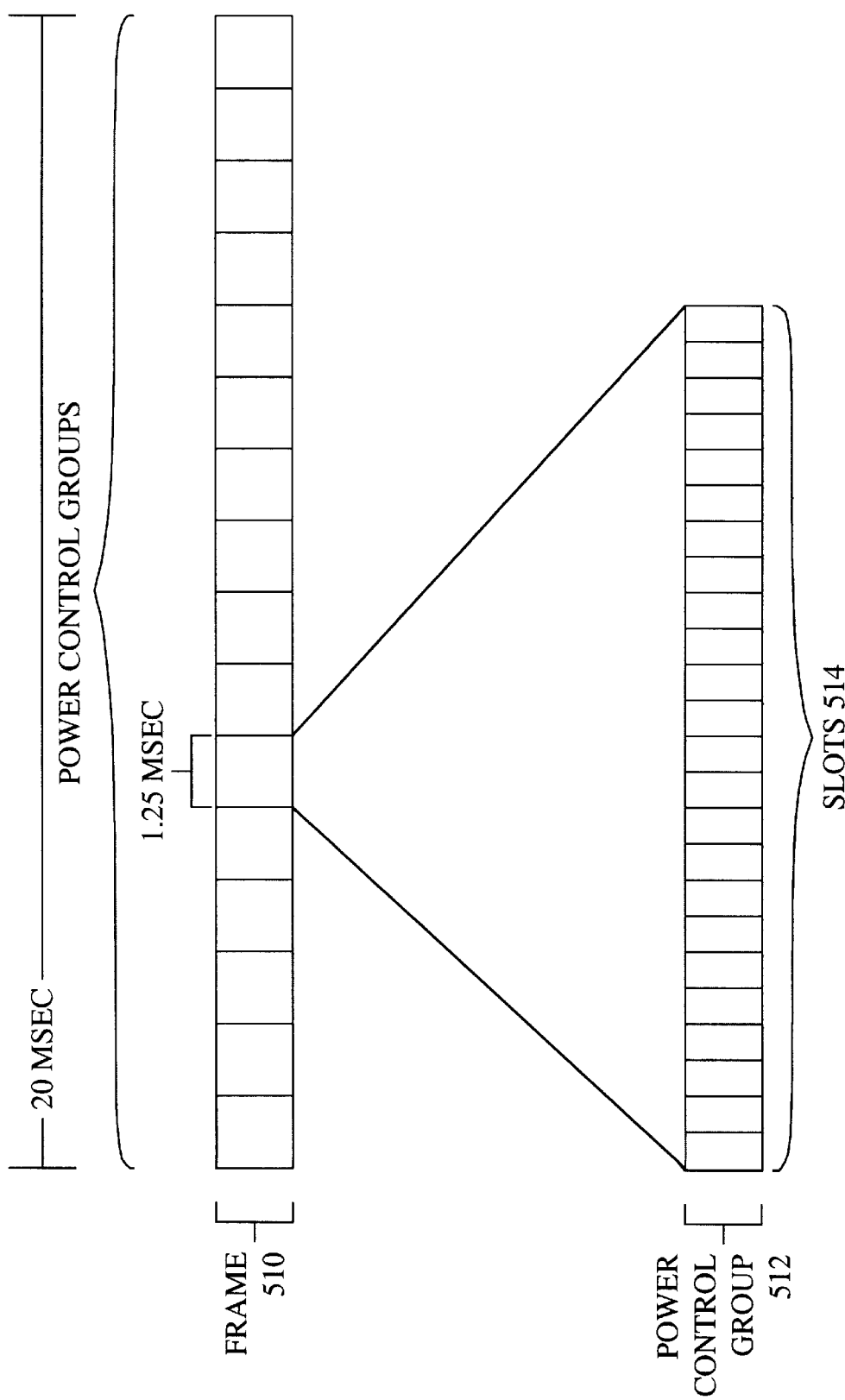
FIG. 5 is a block diagram of a typical CDMA traffic channel frame that stores traffic channel data and power control data.

In CDMA systems, data is packaged in frames. A frame is, essentially, a digital sequence of information bits and other overhead bits. Referring to FIG. 5, a frame 510 is typically 20 milli-seconds in duration. In an embodiment, frames such as frame 510 can be transmitted at either of two frame rate sets that have a maximum rate of either 9600 bits per second (bps) (rate set one) or 14.4 kbps (rate set two).

Traffic within a frame can be transmitted at a traffic rate $r_t$ that is equal to or less than the maximum frame rate. For example, in one embodiment, traffic rate $r_t$ can be 1, ½, ¼, or ⅛ of the frame rate. Thus, for rate set one, traffic rate $r_t$ can be 9600 bps, 4800 bps, 2400 bps, or 1200 bps. Similarly, for rate set two, traffic rate $r_t$ can be 14,400 bps, 7200 bps, 3600 bps, or 1800 bps. In addition to, or alternatively, any number of other rate sets and traffic rates can be employed. Generally, the frame rate remains constant for a period of time. However, traffic rate $r_t$ can vary from frame to frame.

In FIG. 5, frame 510 includes a number of power control groups 512. Power control groups 512 are typically about 1.25 milli-seconds in duration. Each power control group includes a number of slots 514 for storing traffic data bits and power control bits. Power control data is used to transmit closed loop power control commands for the reverse traffic channel. Power control data is carried on the forward traffic channel by placing, or puncturing, one or more power control bits every power control group.

A power control group can have a number of traffic data bits and power control bits. In one embodiment, when rate set one is used, twenty-three slots are reserved for traffic data bits and one slot is reserved for a power control bit. When rate set two is employed, twenty-two slots are reserved for traffic data bits and two slots are reserved for power control bits.

The expected power for a frame of traffic channel is the sum of the power contributed by traffic data and the power contributed by power control data. The power contributed by traffic data depends on the traffic data rate $r_t$ within the frame, the number of user bits in the frame and the traffic data gain $G_t$, which can be, for example, a value from 0 to 255. The power contributed by power control data depends upon the number of power control bits in the frame and the power control data gain $G_s$.

For rate set one, where twenty-two bits of user data and two power control bits are included in a power control group 512, the expected output power for a frame is determined according to equation 2.

$$P_k = \frac{22}{24}G_{t,k}^2 \cdot r_t + \frac{2}{24}G_{p,k}^2 \qquad (2)$$

Where:
$G_{t,k}$=Forward Traffic Gain of Frame for Channel 1;
$G_{p,k}$=Power Control Gain of Frame for Channel 1; and
$r_t$=Traffic Data Rate.

For rate set two, where twenty-three bits of user data and one power control bit are included in power control group 512, the expected output power for a frame is determined according to equation 3.

$$P_k = \frac{23}{24}G_{t,k}^2 \cdot r_t + \frac{1}{24}G_{p,k}^2 \qquad (3)$$

The average power for a channel can be determined from equation 1. The total average power from all channels can be determined according to equation 4.

$$\overline{P}_{tot} = \sum_i \overline{P}_{k,i} \qquad (4)$$

The expected transmit power from each traffic channel 418–422, the average power for a channel and the total average power can be determined in DSP 112 and output as part of expected power data 126. Alternatively, TPTL 120 can include a traffic channel power calculation module (not shown) for calculating these values.

Figure 6:
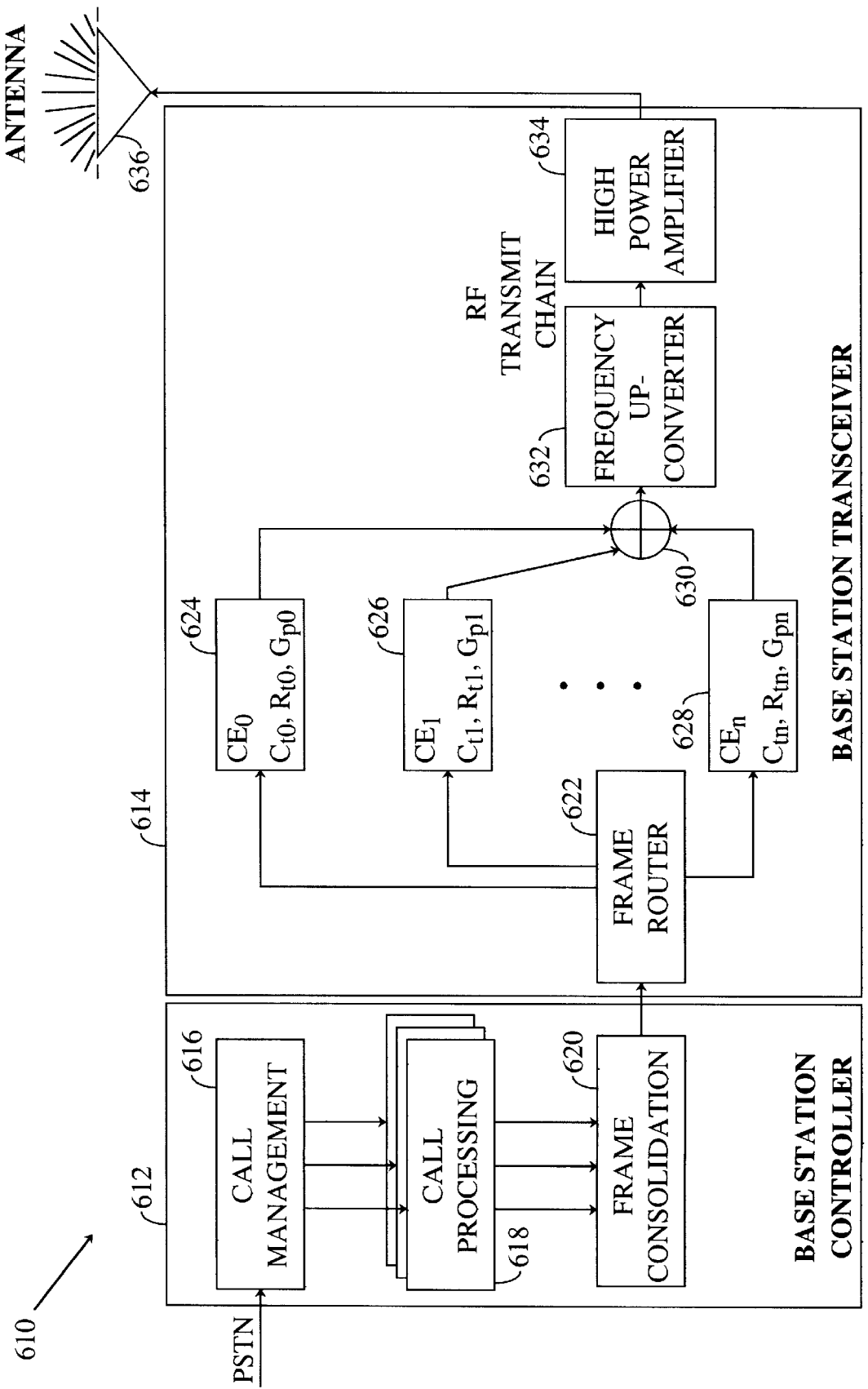
FIG. 6 is a block diagram of a conventional CDMA base station controller and base station transceiver.

The present invention can be designed to take advantage of existing hardware, firmware and software in a CDMA system. Referring to FIG. 6, a CDMA system 610 includes a base station controller 612 and a base station transceiver 614. A typical CDMA system includes a plurality of base station transceivers 614 for each base station controller 612. Base station controller 612 includes a call management system 616, one or more call processing systems 618, and a frame consolidation system 620. Call management system 616 receives telephone calls from one or more public system telephone networks (PSTNs) and determines which call processing system 618 will process the call. Call processing systems 618 process calls and forward data to frame consolidation system 620. The output of frame consolidation system 620 is sent to base station transceiver 614, where it is received by a router 622.

Router 622 sends data traffic gain ($G_t$) information, power control gain ($G_s$) information, traffic data rate ($r_t$) information and frame data to channel elements (CEs) 624, 626–628. Router 622 and CEs 624–628 can be part of DSP 112, wherein CEs 624–628 function as channels 412–422 in FIG. 4.

The output of CEs 624–628 are summed by an adder 630, which can be adder 426. The output of adder 630 is converted from digital to analog and is sent to a frequency up-converter 632, which can be substantially equivalent to up-converter 430. The RF output of frequency up-converter 632 is amplified by high-power amplifier 634 and sent to antenna 636 for broadcasting.

Figure 7:
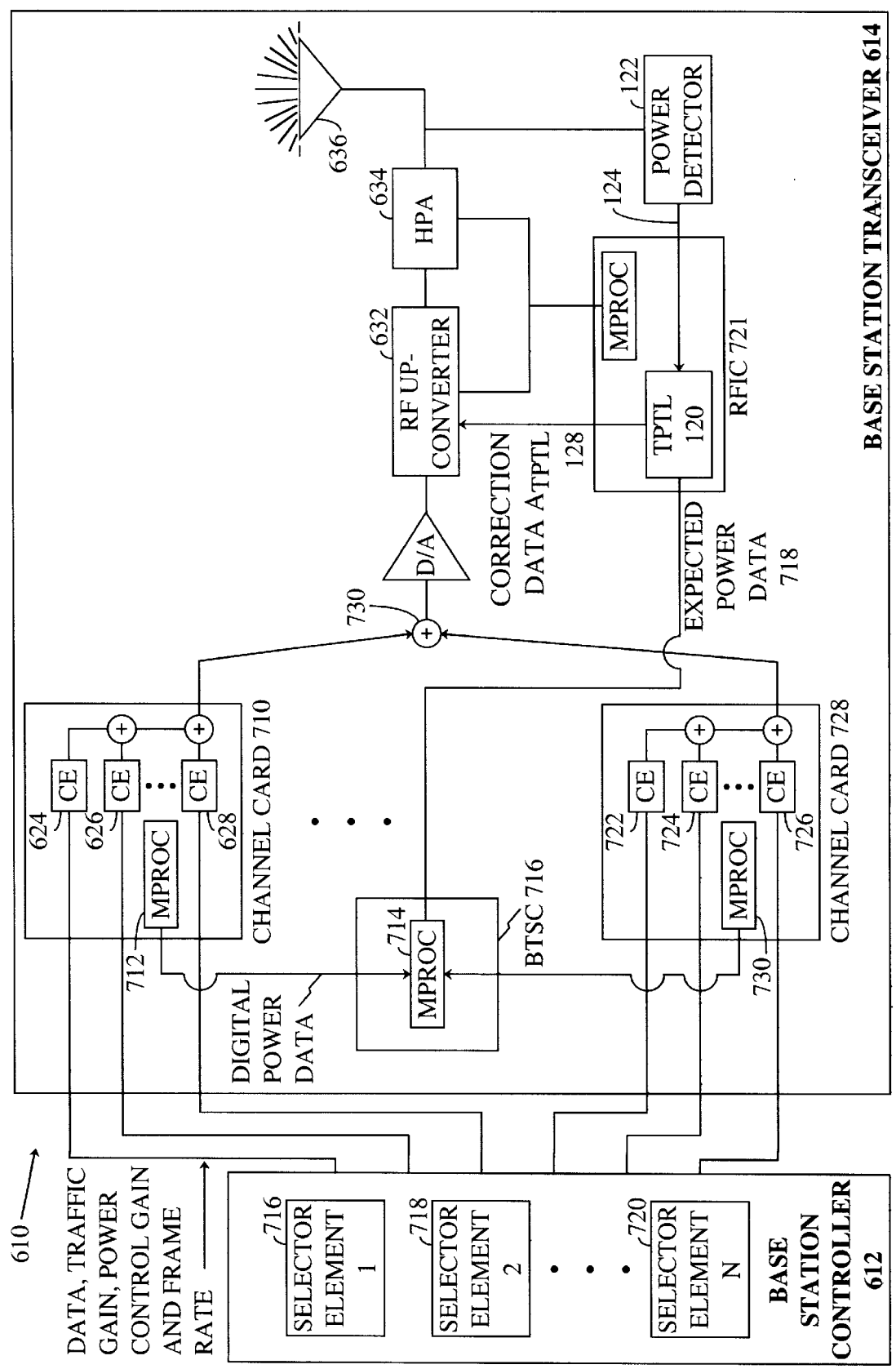
FIG. 7 is a block diagram of a conventional CDMA base station that is modified to incorporate the present invention.

Referring to FIG. 7, CDMA system 610 is redrawn, from a slightly different perspective, as CDMA system 710 with TPTL 120 incorporated therein. Base station controller 612 includes a plurality of selector elements 716–720 that output traffic data, traffic gain $G_t$, power control gain $G_s$, traffic rate $r_t$ and frame data. In one embodiment of the invention, call processing 618 of FIG. 6 is comprised of selector elements 716–720.

The data is received by channel elements 624–628 on channel card 710 and channel elements 722–726 on channel card 728. Additional channel elements and channels cards can be employed as needed. Each channel element 624–628 and 722–726 processes data for a forward channel, such as, for example, one of channels 412–422. Outputs from channel elements 624–628 are added on channel card 710. Outputs from channel elements 722–726 are added on channel card 728. The results are output from each channel card for adding in adder 630.

Channel cards 710 and 728 include a micro-processor 712 and 730, respectively, coupled to each channel element on the channel cards. Micro-processors 712 and 730 are also coupled to a micro-processor 714 in a base station transceiver sub-system controller (BTSC) controller 716.

To implement the present invention in CDMA system 710, software and/or firmware is provided to microprocessors, such as micro-processors 712, 714 and 730 for collecting and adding expected power data from each channel. The software and/or firmware permits BTSC 716 to collect expected transmit power from all active channel elements, such as pilot channel 412, sync channel 414 and paging channels 416. The total expected transmit power is the sum of the expected transmit powers from the individual channel elements, according to equation 4. The result is sent to radio frequency interface card (RFIC) 721 as expected power data 718.

Thus, in CDMA system 710, TPTL 120 is implemented in both software and hardware. TPTL 120 uses outputs from software elements that are already in place on the channel cards and BTSC 716. The main loop functionality is implemented in software on RFIC 721. The software accesses hardware elements on up-converter card 632 and in the transmit front end, for measurement and control purposes. The software on RFIC 721 receives measurement values from power detector 122, channel elements 624–628, BTSC 716 along with attenuation values computed within the RFIC software for power management purposes.

TPTL 120 responds to gain changes in the up-converter and the power amplifier (HPA) and transmit power detector error. Gain variations are mainly due to changes in the ambient temperature and also due to aging.

In an embodiment, the range of allowable variations of the transmitted power is provided in ANSI J-STD 019 standard as +2 dB and −4 dB of the nominal rated power of the base station equipment over the range of environmental conditions specified by the vendor. Considering the accuracy of power detector 122 that is used to measure the transmitted power (typically +/−0.75 dB at best), it is preferred that in the absence of any gain variation, the transmit power should stay within about +/−0.75 dB of the rated power. Assuming perfect power measurements by power detector 122, the performance of TPTL 120 should preferably be such that the transmitted power should stay within about +/−0.5 dB of the rated power under all expected environmental conditions and over time.

Generally, the power spectral density of fluctuations decreases with increasing frequency as 1/f or faster and the bulk of the spectrum lies at frequencies below 1 Hz with almost no fluctuations at frequencies above 1 KHz. Thus, the TPTL loop is preferably designed to operate at 0.5 Hz sampling rate. The TPTL is not meant to track rapid power fluctuations due to variable rates and forward power control.

For example, a worst case scenario could be defined as a sudden ambient temperature change of 20 degrees, in which case the output power can change by, for example, 3 dB in about 10 minutes. The loop design should be able to handle such gain variations and respond slowly enough to allow the mobiles to react to the changing power levels.

Figure 8:
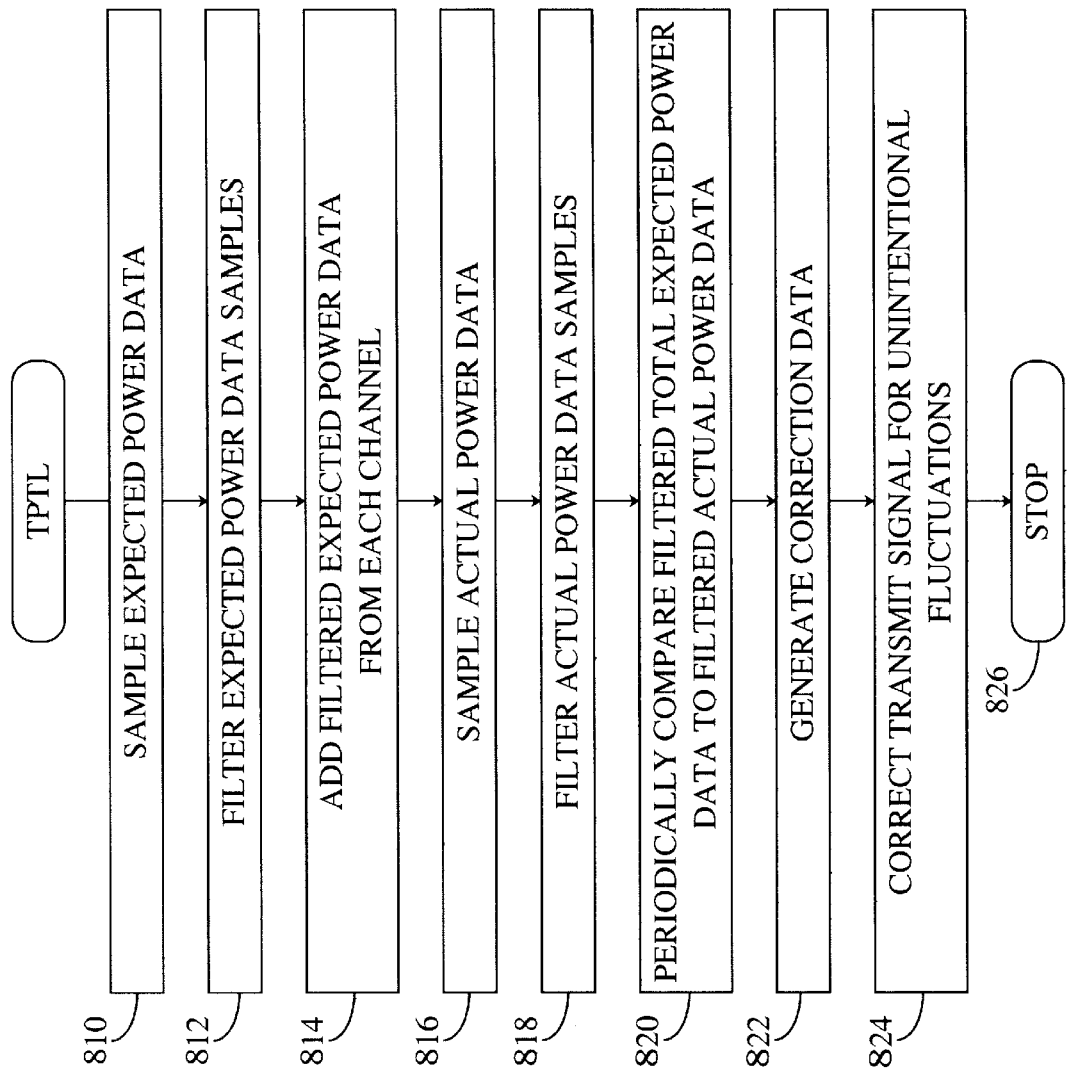
FIG. 8 is a process flowchart illustrating a method for controlling a transmit signal using an expected power level.

Referring to FIG. 8, a process flowchart illustrates the operation of the present invention. The operation is described with reference to CDMA system 710. The process begins at step 810 where expected power data 128 is generated for each active forward channel. In order to generate expected power data 128, each channel element 624–628 and 722–726 samples its forward traffic gain, power control sub-channel gain and frame rate (full, half, etc.) during every frame duration (20 msec). Each channel element 624–628 and 722–726 then calculates the expected power produced by the forward channel.

More specifically, during a first frame (+/−1 frame) following some initial EVEN_SEC tick, the active channel elements sample the traffic gain, $G_t$, the power control sub-channel gain, $G_s$, and the traffic data rate (full, half, quarter, eighth), $r_t$. Samples are also taken by active channel elements during the (k+1) frame (+/−1 frame) following the initial EVEN_SEC tick, or synchronization signal, for k AE 1, for a total of 100 samples between successive $EVEN_{13}SEC$ ticks. The expected transmit power for the channel element is calculated for each sample according to equation two or three, depending upon the frame rate, in units of bits-squared.

In step 812, the calculated expected power for each active forward channel is filtered. In CDMA 610, the calculated expected power for each active forward channel is filtered in each channel element by, for example, a single pole IIR filter, such as IIR 312, according to equation 1. Thus, the function of filter 310 of TPTL 120 is performed in each channel element.

In step 814, the filtered expected power data for each channel is added together. In CDMA 610, after each 100 samples (k=99,199, . . . ), the current state of filter 310, $\overline{P}k$ is sent from each channel element 624–628 and 722–726 to BTSC 716. The total time between messages to BTSC 716 is 100 frames or 2 seconds. The time at which each output of filter 310 is taken is also sent to BTSC 716 so that BTSC 716 can identify corresponding expected powers from different channel elements.

BTSC 716, acting as adding module 322, collects expected transmit powers from all active channel elements, including the pilot, paging, and sync channels. More specifically, BTSC 715 collects the filtered, averaged, expected output powers, $\overline{P}k,i$ from channel elements 624–628 and 722–726, where i denotes a particular channel element. The total expected transmit power is the sum of the expected transmit powers from the individual channel elements. Thus, BTSC 716 sums the expected output powers that correspond to the same time interval, according to equation 4.

In one embodiment, BTSC 716 ensures that all of the active channel elements report their digital gains. When BTSC 716 detects that one or more of the channel elements have not reported their gains, BTSC 716 sends a total digital gain estimate based on data from available elements, every two seconds. BTSC 716 reports the lack of actual channel data condition to radio frequency interface card (RFIC) 721 along with the estimate.

The resulting total filtered expected output power $\overline{P}tot$, is sent to RFIC 721 with an appropriate CDMA system time stamp (accurate to the even second) so that RFIC 721 can compare it to the appropriate actual transmit power measurement.

In step 816, actual power data 124 is generated. In CDMA system 610, RFIC 721 samples a voltage from transmit power detector 122 every other frame (+/−1 frame). RFIC 721 converts the voltage to dBm, subtracts off the correction due to breathing and wilting/blossoming and converts the result to linear units (mWatts). Breathing, wilting and blossoming is discussed in, for example, U.S. Pat. No. 5,475,870, entitled "Apparatus and Method for Removing a Base Station from a Cellular Communications System", incorporated herein by reference in its entirety.

More specifically, during the first frame (+/−1 frame) following some initial EVEN_SEC tick, RFIC 721 samples the analog voltage from transmit power detector 122 and converts the result to dBm. Further samples are taken during the (2*k+1) frames (+/−1 frame) following the initial EVEN_SEC tick for kAE1, for a total of 50 samples between successive EVEN_SEC ticks.

In step 818, RFIC 721 filters this value using filter 324 that is similar to filter 310 that is used by the channel elements. In an exemplary embodiment, channel elements 624–628 sample their digital gains at every frame duration and RFIC 721 samples only every other frame duration, so that the time constant of filter 324 should be twice that of filter 310. Filter 324 can have an input/output relation such as, for example:

$$Yk = \gamma 1 \cdot Yk{-}1 + ) 1 {-} \gamma 1) \cdot x \quad (5)$$

In step 820, the filtered expected output power data and the filtered actual power data is compared. In TPTL 120, this is performed by comparator module 316. After every 50 power samples, RFIC 721 takes the output of filter 324, removes the current TPTL correction and compares the result to the expected transmit power.

More specifically, after each 50 samples (k=49,99,149, . . . ), RFIC 721 removes the current TPTL gain, $A_{TPTL}$, and compares the result with the expected power received from BTSC 716. It is important that the time stamps of the expected power from BTSC 716 and that of the filtered, measured transmit power agree, (i.e., that they correspond to the same value of k). These time stamps will have appropriate precision. If RFIC 721 fails to receive an estimate from BTSC 716 for any even second period, the current TPTL gain correction is kept constant and a timer is started. If the timer expires after 20 seconds, RFIC 721 informs BTSC 716 about this situation.

In step 822, correction data 128 is generated in module 320 by filtering the ratio of the expected power and the measured power. The ratio can be filtered by, for example, single pole IIR filter 328 with transfer function $H_{TPTL}$.

In step 824, the calculated TPTL gain correction is then converted to a dB quantity and is added to the sum of the existing attenuation or gain value.

As would be apparent to a person skilled in the art given the description of the present invention, the transfer function $H_{TPTL}$ that is employed by filter 328 can be implemented in a variety of ways. In one embodiment, $H_{TPTL}$ is a single pole IIR filter as now described. These examples are provided to assist in the description of the present invention, not to limit it.

Figure 9:
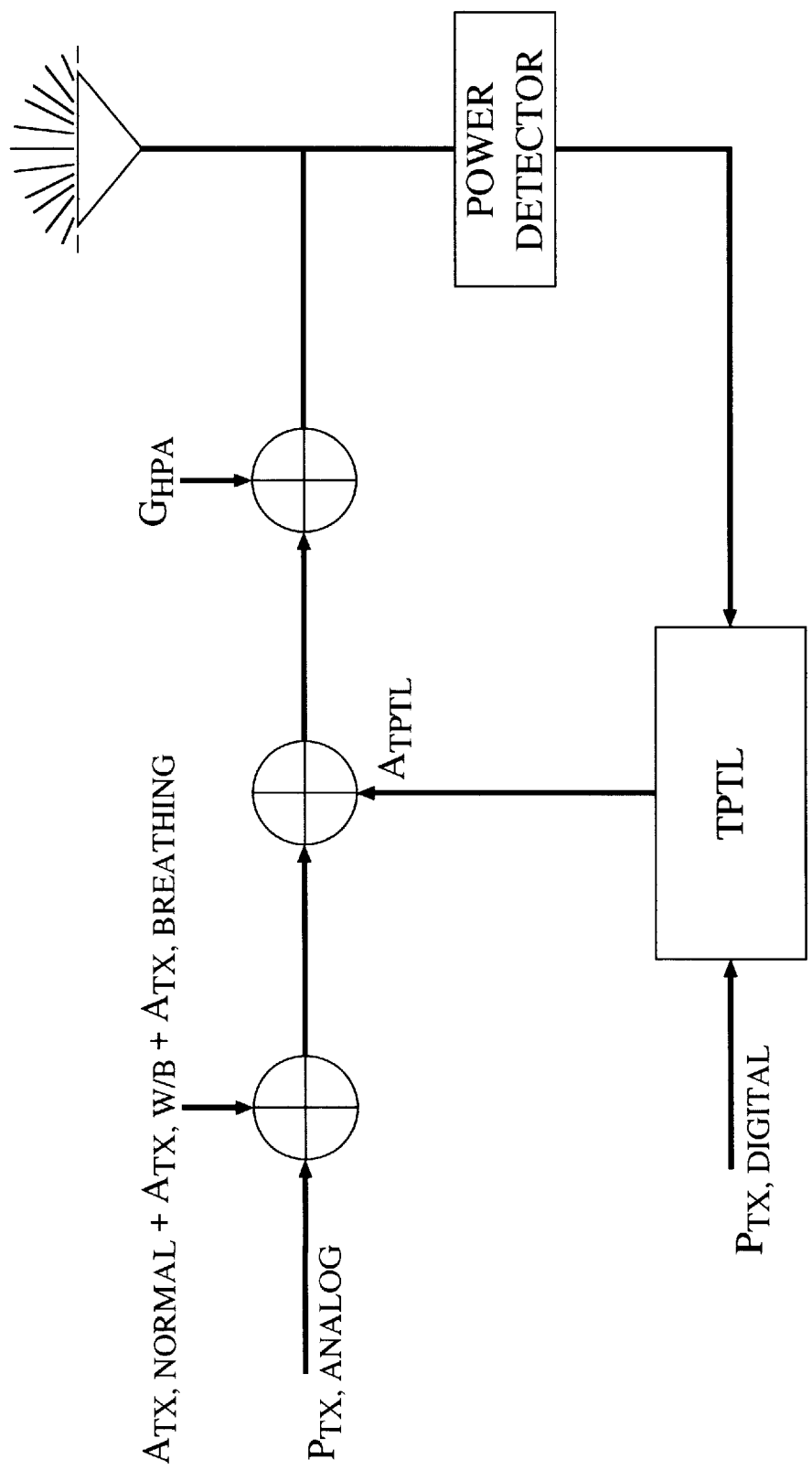
FIG. 9 is a block diagram of a signal transmission system including average signal power flow through a transmit chain and an expected transmit power signal.

Referring to FIG. 9, the average signal power flow through the transmit chain is illustrated. $P_{TXanalog}$ is the average signal power (in dBm) out of the up-converter. Attenuation values $A_{TXnormal}$, $A_{TX, W/B}$ and $A_{TXbreathing}$ represent normal attenuation, wilting and blossoming attenuation and breathing attenuation, respectively. The total effect of these attenuations is implemented on up-converter card 632 by a voltage controlled attenuator which is controlled by RFIC 721 software, where attenuation values are computed. $G_{HPA}$ represents the power gain provided by high power amplifier (HPA) 634. HPA 634 output goes to transmit antenna 636 via a transmit front end. Power detector 122 is implemented on the transmit front end and provides measurements of the total average power transmitted which is used to estimate the transmit pilot power for power limiting purposes. $P_{TXanalog}$, $A_{TXnormal}$, $A_{TX, W/B}$, $A_{TXbreathing}$, $G_{HPA}$ are represented here in units of dBm.

Aside from these real quantities, a software generated digital transmit power (in bits-squared) estimate, $P_{TXdigital}$, represents the amount of power desired to be transmitted. The aim of TPTL 120 is to use this estimate as the driving force of a control loop in order to compensate for gain variations as a result of temperature changes and aging.

Figure 10:
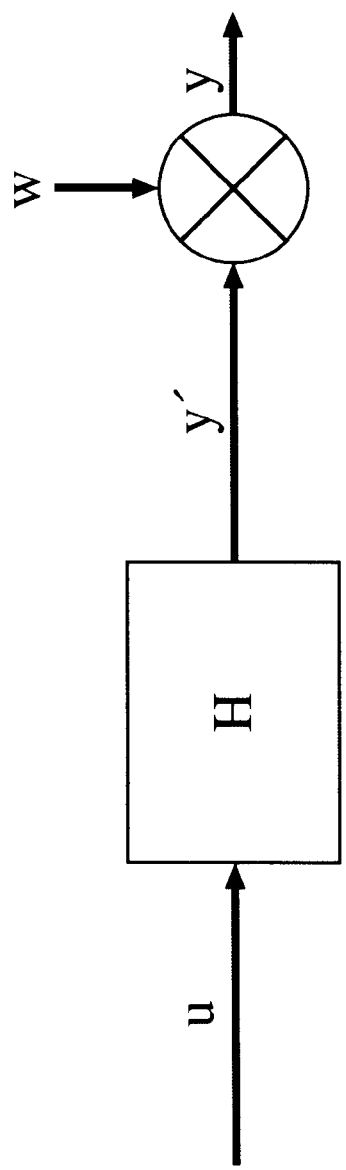
FIG. 10 is a block diagram of an open-loop model of the TPTL, according to the present invention.

Since the attenuation values for wilting, blossoming, breathing and the normal attenuation is known (computed) they may be ignored in the loop design. The basic open-loop model for the transmit power tracking loop is illustrated in FIG. 10. The quantity u is the control input, H is the loop filter to be determined, y' is the control output attenuation, w represents the gain disturbance caused by the transmit chain and y is the final output power. The w and y are shown as linear quantities, however, the use of logarithmic values in combination with additional z subtraction operations is also contemplated. The goal is to design a feedback input so that the output power, y, follows the estimated desired output $P_{TXdigital}$, in spite of the disturbance w.

In designing a closed-loop system, let the linear filter H have a state-space representation {A, b, c} and assume that w changes slowly enough that it is almost constant over the time period of interest (time duration between every step of the TPTL algorithm). The overall system can be represented as:

$$x(k+1) = Ax(k) + b \cdot u(k) \quad (6)$$

$$y'(k) = c'x(k) \_ y(k) = w(k)c'x(k) \quad (7)$$

The design criteria is to pick the input u(k), so that y(k) converges to $P_{TXdigital}$ in the steady state. This requires the existence of an equilibrium state such that $$x_e = Ax_e + b \cdot u_e \quad (8)$$

$$x_e = (I-A)^{-1} b \cdot u_e \quad (9)$$

which gives, $$y_e = w \cdot c'(I-A)^{-1} b \cdot u_e \quad (10)$$

Hence, if y(k) is to converge to $P_{TXdigital}$ u must be chosen as:

$$u(k) = \frac{P_{TXdigital}(k)}{w(k) \cdot c^1 (I-A)^{-1} b} \quad (11)$$

Figure 11:
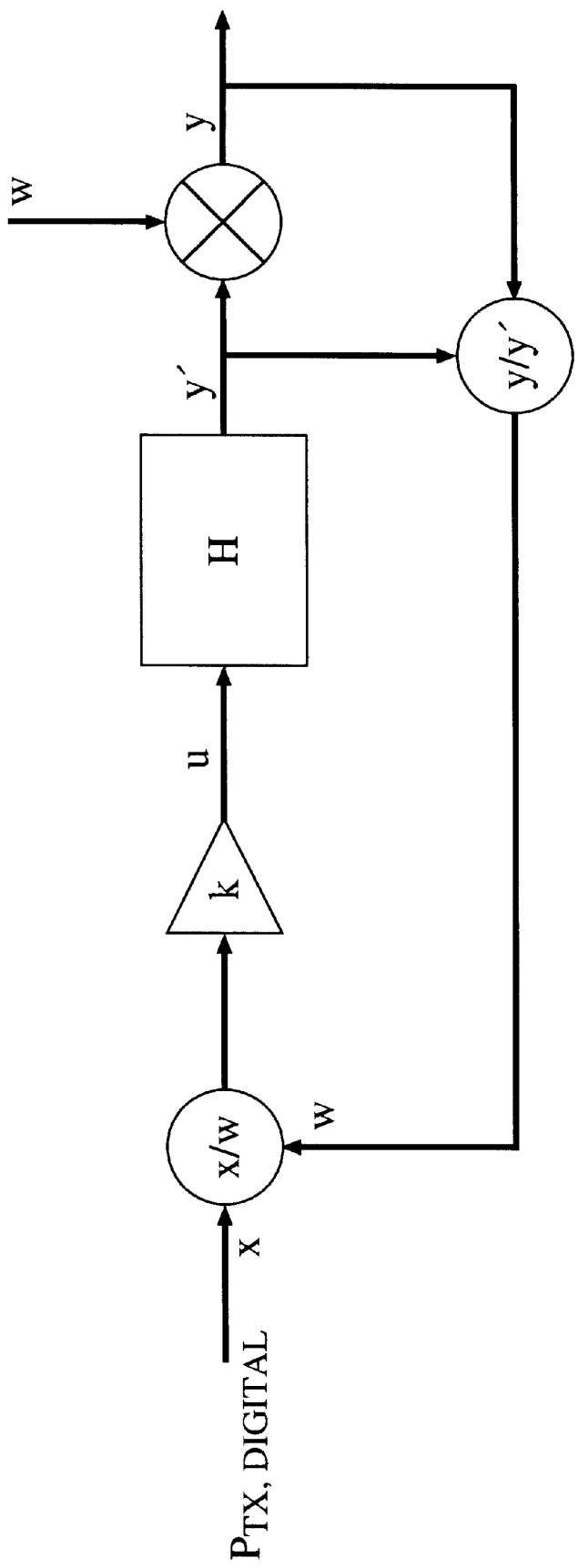
FIG. 11 is a block diagram of a closed-loop model of the TPTL, according to the present invention.

Thus, the control input consists of $P_{TXdigital}$ and a feedback connection from w (Note: w is simply y/y'). The closed loop system is illustrated in FIG. 11, where, $$k = \frac{1}{\underline{c}(I-A)^{-1}\underline{b}} \tag{12}$$

Figure 12:
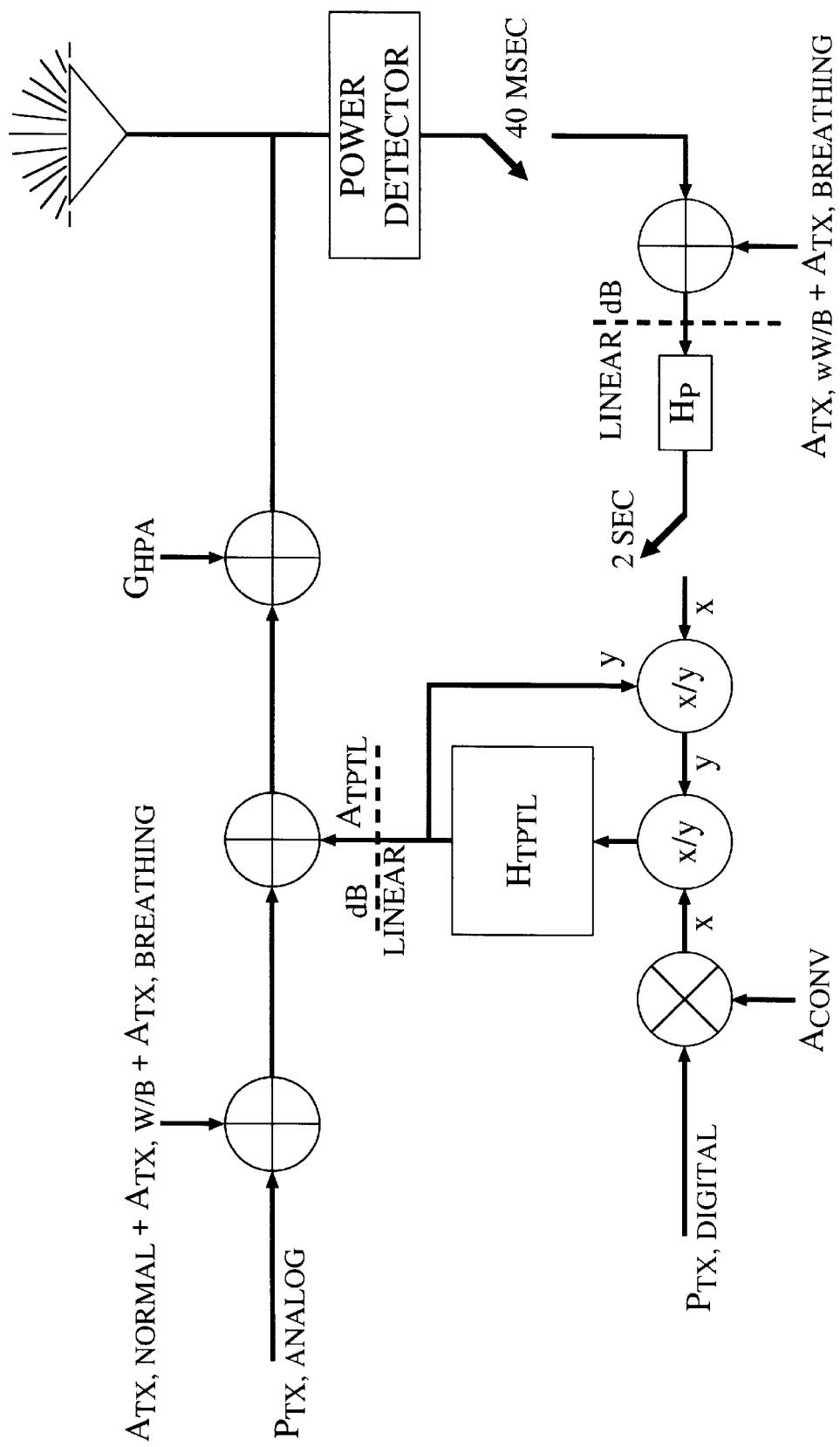
FIG. 12 is a detailed block diagram of the TPTL, according to the present invention.

Referring to FIG. 12, the TPTL functionality within the transmit power flow diagram of FIG. 9 is illustrated.

Note that on the feedback path, the total of all the attenuations introduced by the power management algorithms is taken out of the measurement, since the purpose of the TPTL is to compensate only for gain variations due to temperature and aging of the components. The corrected measurement is then converted to linear scale and filtered in order to reflect the effects of digital gain sampling and filtering carried out on the channel cards for the computation of $P_{TXdigital}$. The corrected measurement is preferably provided in units of dBm, whereas BTSC 716 sends its expected power in units of bit-squared. Hence, the BTSC sample is multiplied by a conversion constant $A_{Conv}$ which can be, for example:

$$A_{conv} = \frac{4000}{255^2} \tag{13}$$

Here, the numerator reflects the a digital gain of 255 that corresponds to 4 Watts (i.e., 4000 mW) and an eight bit gain factor. This gain is used for a pilot-only signal that is transmitted during calibration of BTSC 716.

Considerations for the choice of the loop filter H include tracking speed, sensitivity to measurement error and amount of computation. The purpose of TPTL 120 is not to correct for rapid fluctuations in w. In fact, for the worst case of a linear ramp transition in w, it is desirable to bring the corrected output power back to the desired output power in a gradual manner, allowing mobile transmitters (i.e., cellular phones) to react to the changing power levels. Hence, a filter with a relatively longer time constant is desired. This is fortunate, since such a filter is also better at minimizing sensitivity to measurement noise and requires a smaller amount of computation.

This latter fact is important since the filter requires the computation of $P_{TXdigital}$, which involves the sum of squares of all the forward channels. This calculation is done by BTSC 716, which acquires information on the forward gains and voice activity of each channel, computes the expected output power and forwards the information to RFIC 120. All this communication must use resources of the BIU, which may be limited. Hence, there are also practical limitations to the speed that the TPTL can track output power.

Since the TPTL requirements are not very demanding, a very simple filter will do, such as, for example, a single-pole IIR filter with transfer function:

$$H(z) = \frac{1}{z-a} \tag{14}$$

The equivalent time domain description is given by:

$$y(n+1) = ay(n) + x(n) \tag{15}$$

or, in terms of the state-space parameters introduced before:

A=a b=c=1

Figure 13:
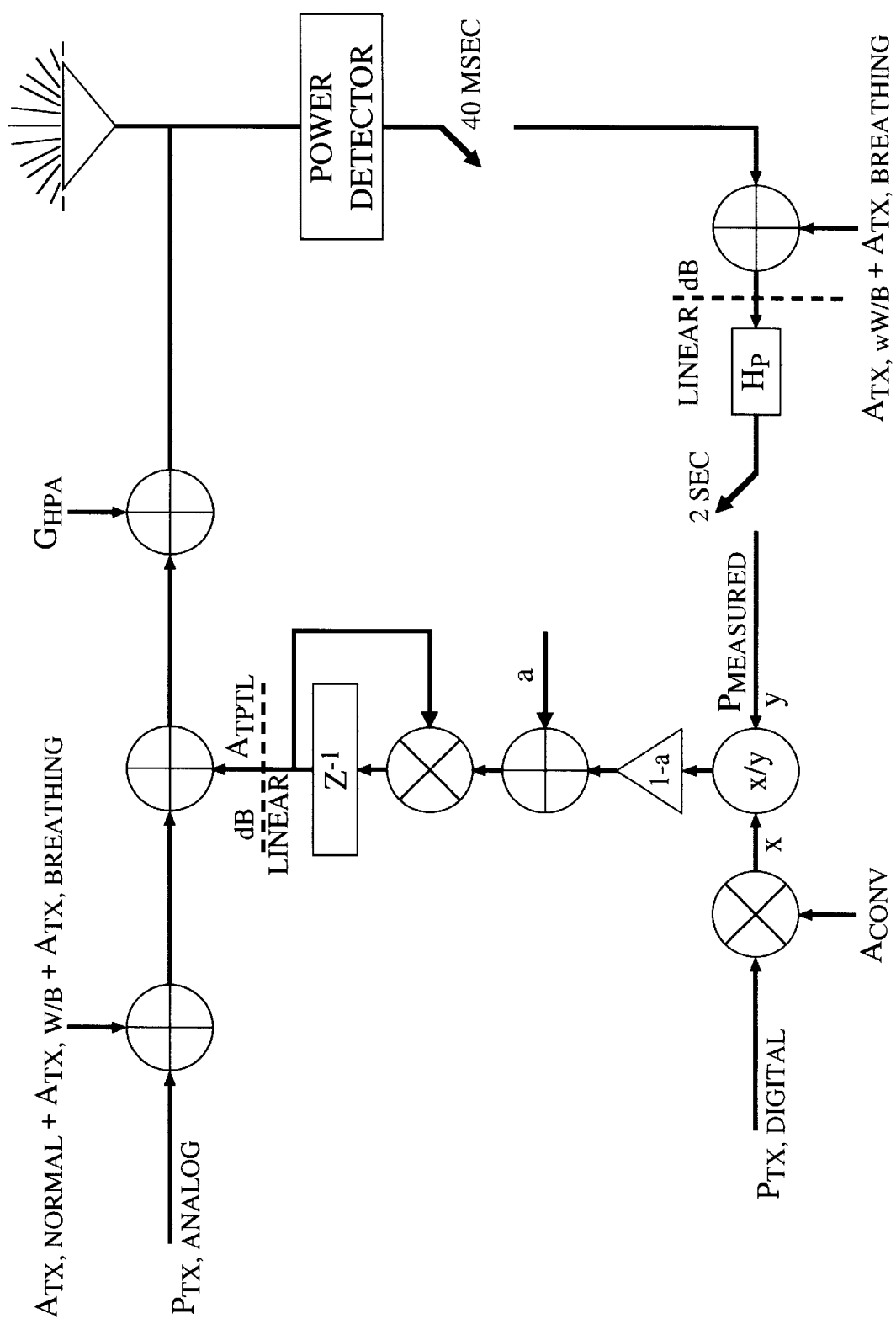
FIG. 13 is a block diagram of the TPTL of illustrated in FIG. 12 within the block diagram of FIG. 9.

Then, the constant k becomes:

$$k = \frac{1}{\underline{c}(I-A)^{-1}\underline{b}} = 1-a \tag{16}$$

and the resulting filter provides the loop structure illustrated in FIG. 13. The TPTL attenuation (in linear units) is given by $$A_{TPTL}(n+1) = A_{TPTL}(n)x\left[(1-a)\frac{P_{TX'\text{digital}}(n)}{P_{measured}(n)} + a\right] \tag{17}$$

Note that equation 17 is obtained by substituting H(z) in the closed loop model of FIG. 12 and finding the equivalent simplified structure. Assuming a is chosen such that:

$$a=1-2^{-\alpha}$$

The free parameter in this filter is a. The TPTL gain update equation can be expressed as:

$$A_{TPTL}(n+1) = A_{TPTL}(n) - 2^{-\alpha} \cdot \frac{P_{TXdigital}(n)}{P_{measured}(n)} \tag{18}$$

Figure 14:
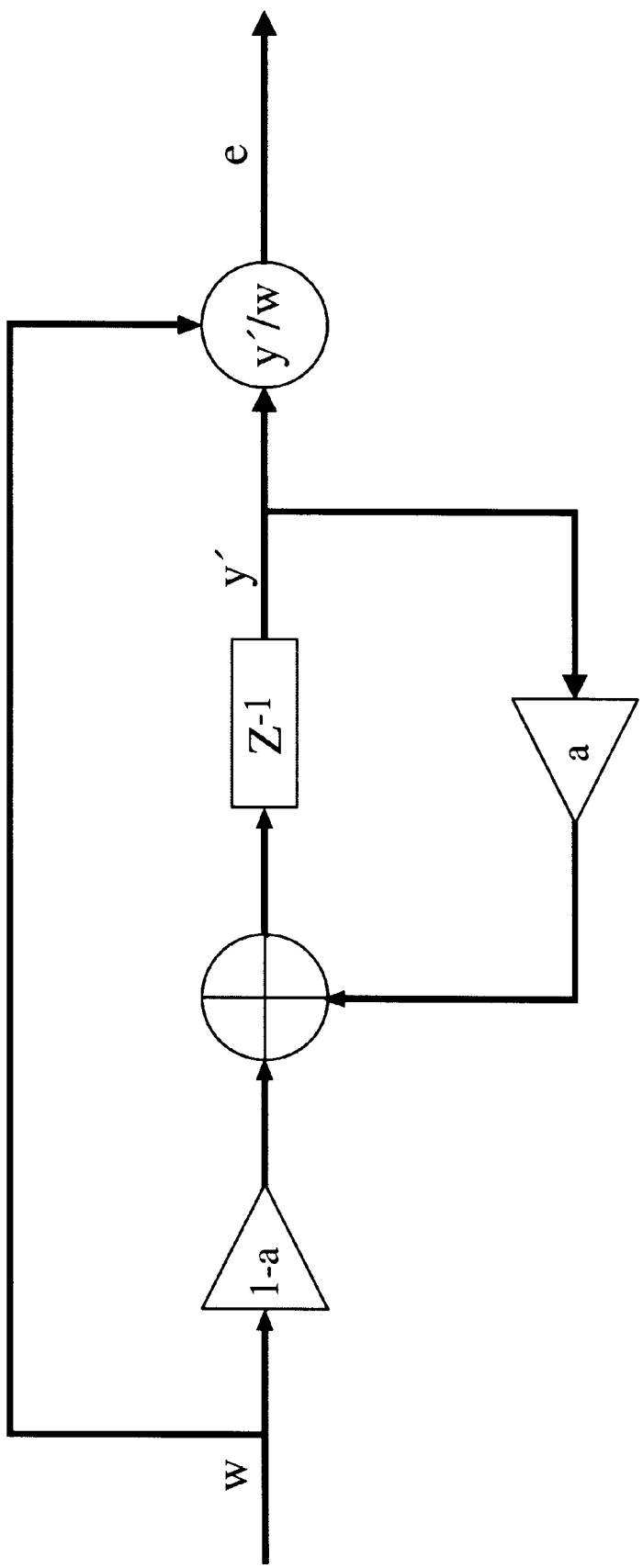
FIG. 14 is a block diagram illustrating a model for residual error.

Referring to FIG. 14, in order to see the effect of the TPTL filter pole 'a', assume that there is no measurement noise and the measured and the estimated power differ only by the gain disturbance w (an idealized situation). The signal e(n) is defined as:

$$e(n) = \frac{y^1(n)}{w(n)} \tag{19}$$

and gives the residual error from TPTL correction. A difference equation for the residual error in terms of the input w(n) can easily be derived which is given by:

$$e(n+1) = a \cdot e(n) \cdot \frac{w(n)}{w(n+1)} + (1-a) \cdot \frac{w(n)}{w(n+1)} \tag{20}$$

Assuming the disturbance to be a linear ramp (in dB), the steady state residual error (in linear units) is given by:

$$e_{ss} = \frac{(1-a) \cdot 10^{\Delta w/10}}{1 - a \cdot 10^{\Delta w/10}} \tag{21}$$

where $\Delta w$ is the constant slope of the ramp. In an embodiment, the residual error is preferably less than 0.5 dB in absolute value. Therefore, using the above relation the maximum ramp slope can be computed for a given pole value. Assuming that the pole value is quantized so that 1−a is a power of 2 and $\Delta w$=Å0.01 dB/2 sec (equivalently a 3 dB change in 10 mins) it is easily found that for a=0.9375, $e_{ss}$<0.5 dB.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A method for compensating for power fluctuations in a signal transmission system, wherein the signal transmission system converts digital data to analog signals for transmission from an antenna, comprising the steps of:
(1) determining an expected output power level from the digital data;
(2) determining an actual output power level;
(3) periodically comparing the expected output power level to the actual output power level; and
(4) generating correction data from a transmit power tracking loop to compensate for differences between the expected output power level and the actual output power level that are due to unintentional power fluctuations;

wherein the transmit power tracking loop is an infinite impulse response filter with gain update given by:

$$A_{TPTL}(n+1) = A_{TPTL}(n) - 2^{-a} \cdot \frac{P_{TXdigital}(n)}{P_{measured}(n)};$$

with free parameter a, where $a=1-2^{-a}$;

$P_{TXdigital}(n)$ is the even transmitted power; and $P_{measured}(n)$ is the given measured power; and n is an integer.

2. The method according to claim 1, wherein step (1) comprises the steps of:
  (a) sampling the digital data at a first rate;
  (b) calculating a present expected output power level from the sampled digital data; and
  (c) averaging the present expected output power level with prior expected output power levels.

3. The method according to claim 2, wherein step (2) comprises the steps of:
  (a) sampling an actual transmit signal output at a second rate;
  (b) calculating a present actual output power level from the sampled actual transmit signal output; and
  (c) averaging the present actual output level with prior actual output levels.

4. The method according to claim 3, wherein step (3) comprises the step of:
  (a) periodically comparing the expected output power level to the actual output power level at a third rate, wherein the third rate is lower that the first and second rates.

5. The method according to claim 3, wherein step (2)(a) comprises the step of:
  (i) removing correction values that were added to the transmit signal to compensate for breathing and wilting/blossoming.

6. The method according to claim 5, wherein step (2)(a) further comprises the step of:
  (ii) removing a correction value that was added to the transmit signal to correct for unintentional power fluctuations.

7. The method according to claim 1, wherein step (1) comprises the steps of:
  (a) sampling the digital data from a plurality of digital channels;
  (b) calculating a present expected output power level for each of the plurality of digital channels from the sampled digital data;
  (c) for each of the plurality of digital channels, averaging the present expected output power level with prior expected output power levels; and
  (d) adding the average expected output power level for each channel.

8. The method according to claim 7, wherein step (1)(b) comprises the step of:
  (i) calculating the present expected output power level for each of the plurality of digital channels from a forward traffic gain value, a power control gain value and a traffic data rate value that are associated with the respective channel.

9. The method according to claim 1, wherein step (4) comprises the step of:
  (a) filtering a ratio or difference of the expected output power level and the actual output power level with a single pole, infinite impulse response filter.

10. The method according to claim 9, wherein step (4) further comprises the steps of:
  (b) converting the filtered ratio to a dB quantity; and
  (c) adding the dB quantity to existing correction values.

11. A system that compensates for power fluctuations with a transmit power tracking loop in a signal transmission system, wherein the signal transmission system includes a digital signal processor that outputs digital data that is converted to one or more analog signals for transmission from an antenna, comprising:
  a first filter that averages a present expected output power level and prior expected power levels to generate an expected output power level;
  a second filter that averages a present actual output power level and prior actual output power levels to generate an actual output power level;
  a comparator that periodically compares the expected output power level to the actual output power level and that generates a ratio or a difference therefrom; and
  a correction generator that generates correction data from the ratio or difference to correct for unintentional power fluctuations;

wherein the transmit power tracking loop is an infinite impulse response filter with the gain update given by:

$$A_{TPTL}(n+1) = A_{TPTL}(n) - 2^{-a} \cdot \frac{P_{TXdigital}(n)}{P_{measured}(n)};$$

with free parameter a, where $a=1-2^{2-a}$;

$P_{TXdigital}(n)$ is the given transmitted power; and $P_{measured}(n)$ is the given measured power; and n is an integer.

12. The system according to claim 11, wherein said first filter averages a present expected output power level and prior expected power levels for each of a plurality of digital channels to generate an expected output power level for each of the digital channels, said system further comprising:

an adding module for adding the expected output power levels for each of the plurality of digital channels.

13. The system according to claim 11, further comprising:

means for calculating the present expected power level from a forward traffic gain value, a power control gain value and a traffic data rate value that are associated with the respective channel.

14. The system according to claim 11, wherein said second filter comprises:

means for removing correction values from the present actual output power level.

15. The system according to claim 11, wherein said comparator comprises:

means for removing a correction value from the actual output power level that was added to the transmit signal by the correction generator.

* * * * *